M. V. WILSON.
MEANS FOR KILLING VEGETABLE AND ANIMAL LIFE ON BOAT HULLS.
APPLICATION FILED AUG. 8, 1919.
1,319,550.
Patented Oct. 21, 1919.
2 SHEETS—SHEET 2.
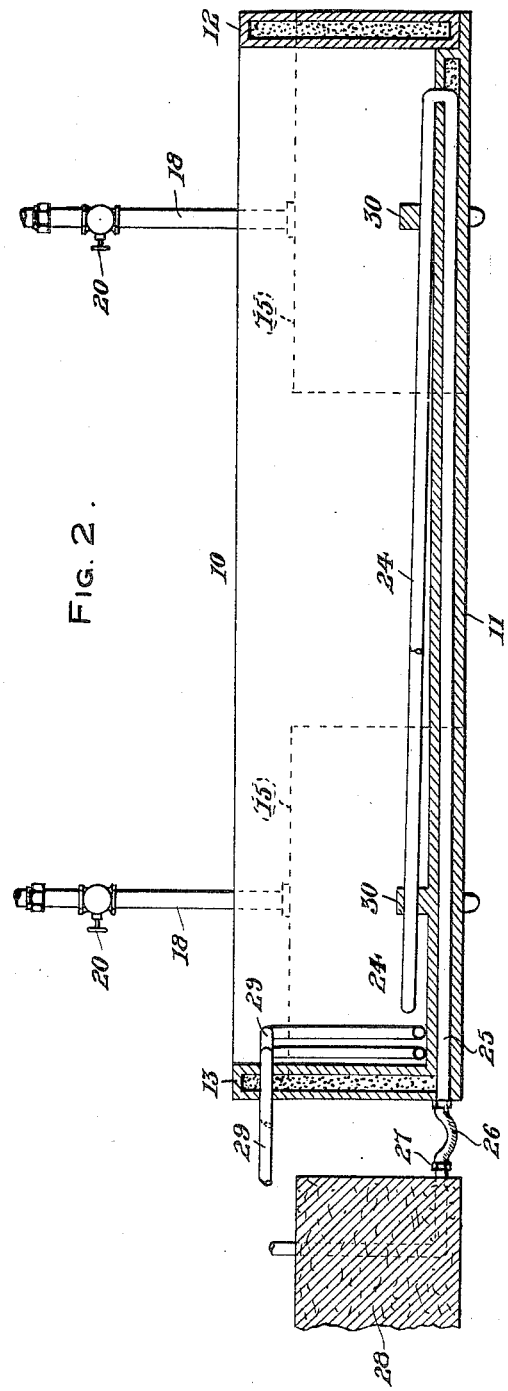
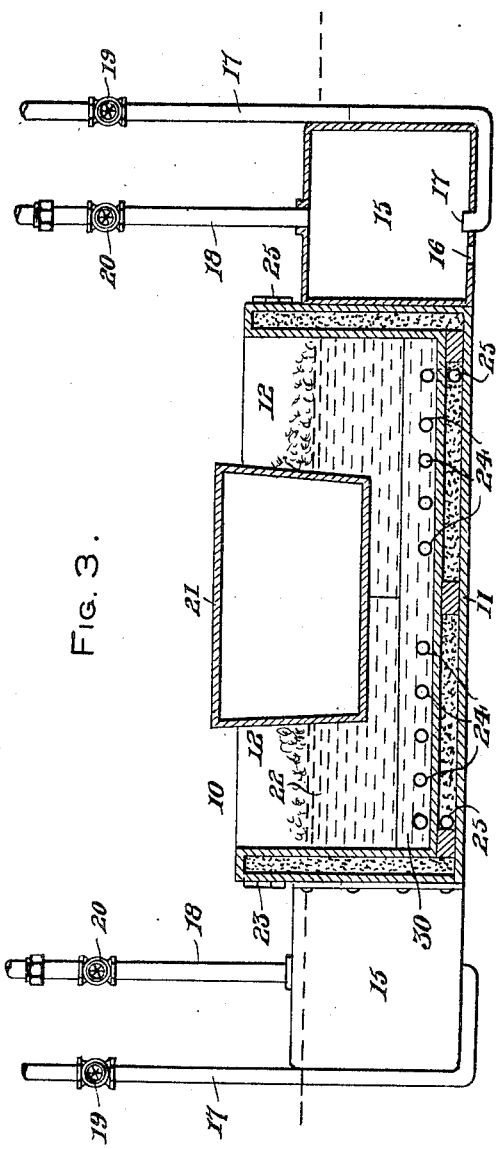
Inventor
Mary V. Wilson
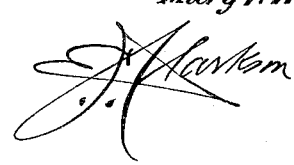
By
Attorney

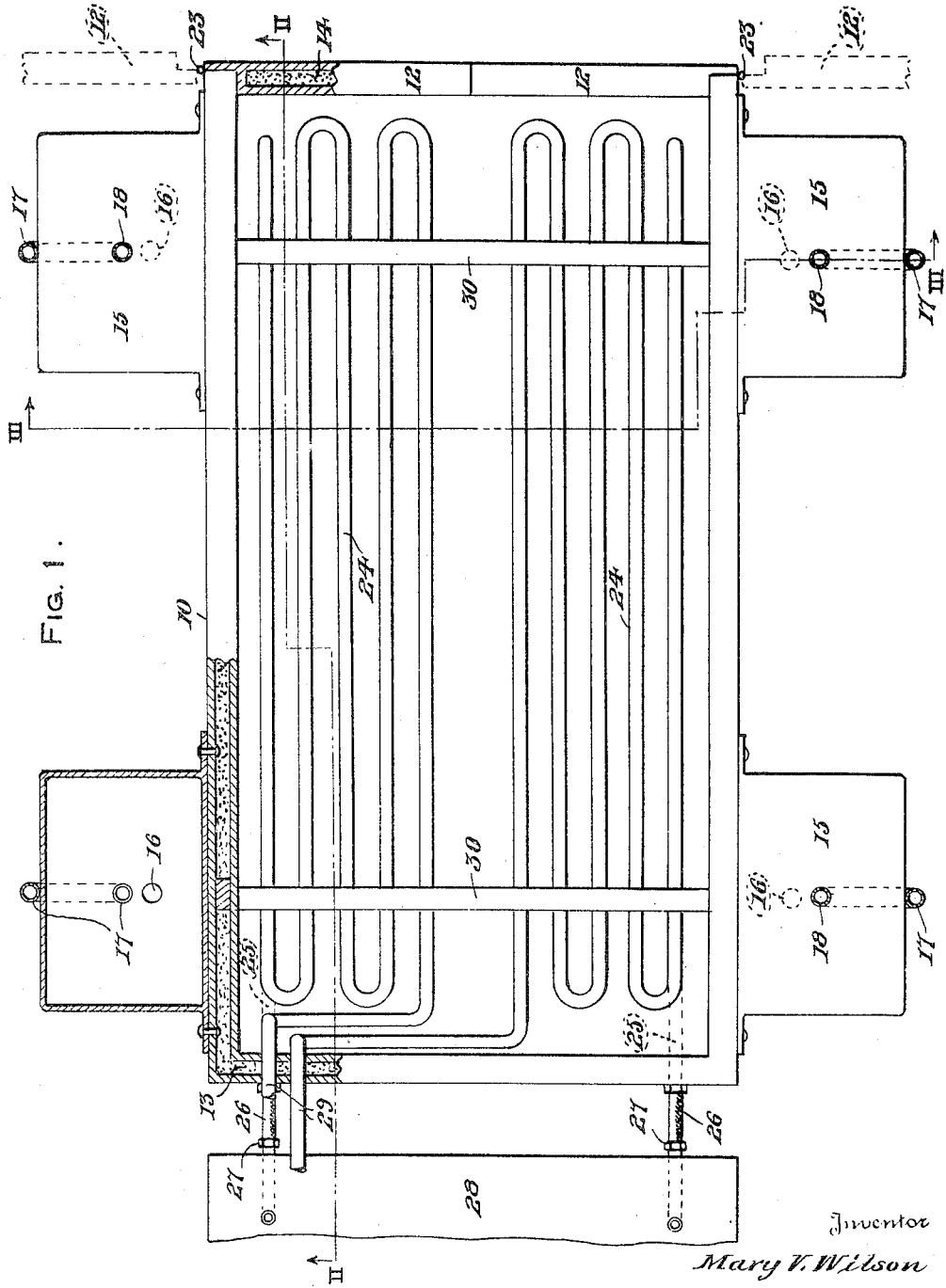

UNITED STATES PATENT OFFICE.

MARY V. WILSON, OF NORFOLK, VIRGINIA.

MEANS FOR KILLING VEGETABLE AND ANIMAL LIFE ON BOAT-HULLS.

1,319,550.   Specification of Letters Patent.   Patented Oct. 21, 1919.

Application filed August 8, 1919. Serial No. 316,088.

*To all whom it may concern:*

Be it known that I, MARY V. WILSON, a citizen of the United States of America, residing at Norfolk, in the county of Norfolk and State of Virginia, have invented certain new and useful Improvements in Means for Killing Vegetable and Animal Life on Boat-Hulls, of which the following is a specification.

The primary object of the invention is the provision of ready means for cleaning the hull of a ship or boat, easily and quickly when the same becomes covered with barnacles and crustaceans and any vegetable as well as animal life, it being unnecessary to dry-dock the vessel during the operation.

A further object of the invention is to provide ready means for cleaning a hull without taking the same out of the water, the operation serving to kill all manner of animal and vegetable life, upon the surface of the hull as well as borers beneath the surface thereof.

It is also an object of my invention to provide a floating boiler for the reception of the hull of a boat, in whatever position the same may lie in the water, the boiling operation serving to kill animal and vegetable life, upon the hull for its ready removal, the invention being of simple construction, and easily operated from a neighboring dock or float.

With these general objects in view the invention consists of the novel combination and arrangement of parts hereinafter fully described, in connection with the accompanying drawings, and in which like reference characters designate similar parts throughout the several views, In the drawings, Figure 1 is a top plan view of the invention partially broken away and Figs. 2 and 3 are sectional views taken upon lines II—II and III—III respectively of Fig. 1.

Referring more in detail to the drawings, I provide a floating boiler 10 in the form of a scow having a flat bottom 11 and two hinged doors 12, for closing the stern thereof while the side walls and bottom have an insulating chamber 13 and a corresponding chamber 14 is provided in each door 12.

Floats 15 are provided at the corners of the scow 10 having outlets 16 in the bottoms thereof, air being forced into the floats 15 through pipes 17 and exhausted through pipes 18 for regulating the submergence of the scow as may be desired. Valves 19 and 20 for the pipes 17 and 18 respectively, control in this manner, the amount of air as well as water, within each float 15 so that one end, side or corner of the scow 10 may be at a greater depth than another. In this manner, the stern of the scow may be submerged lower than the bow thereof, permitting a boat 21 to be drawn into the scow upon opening the doors 12, or the scow may be drawn beneath the hull 21, so that in either event, the said hull will be inclosed within the scow 10 when the doors 12 are closed, and a quantity of water 22 for floating the hull will be trapped within the scow. The doors 12 are moved upon their hinges 23 in any desired manner and are substantially watertight when closed, One or more heating coils 24 are positioned within the scow 10 adjacent the bottom 11, for receiving steam or hot water, from any suitable source of supply such as a boiler, not shown, connected to the entrance end or link 25 of the coils positioned between the portions of the double bottom 11. A suitable connection 26 with the pipe link 25 may connect with a steam pipe 27 upon a dock or float 28, carrying a boiler, which it is unnecessary to herein illustrate. The coils 24 are inclined toward the stern of the scow 10 and may also have connecting pipes 29.

From this detailed description of the invention, the operation thereof will be fully apparent, the manner of floating the hull 21 into the scow 10 having been set forth, the coils 24 are heated to such a degree as to cause the boiling of the water 22 whereby the exterior of the hull 21 is boiled off, thereby killing any animal and vegetable life, positioned upon the hull. After the hull 21 is positioned within the scow 10, the floats 15 may be filled with air for raising the scow in the water, while further supply of water may be positioned in the scow to raise the elevation of the boiling water 22 as desired to insure the clearance of the hull above the coils 24. As illustrated in Figs. 2 and 3 the coils 24 are located above the bottom 11, while the supply pipes 25 are positioned between the double walls, the connection between the coil and pipes intimately contacting the bottom wall of the scow to insure a rigid mounting for the pipes within the scow. The coils are inclined upwardly and rearwardly to permit a free circulation of water thereabout, thus to offer greater radiating surfaces to the water confined within the scow to be heated. Transverse beams 30 are carried by the upper face of the scow bottom and constitute supports through which pipe sections of the coils 24 extend and hold the coils rigidly suspended.

While the form of the invention herein set forth is believed preferable, it may be understood that minor changes may be made therein without departing from the spirit and scope of the invention, so long as the structure is capable of readily receiving a hull, for the boiling of water, upon which the hull floats, the operation being suitably regulated at will. The floats 15 permit the scow 10 to have one side thereof lower than the other when partially submerged for receiving a hull so that a hull which is tilted or inclined may be readily received within the scow 10 even though the hull such as 20 be of the flat-bottom variety.

What I claim as new and desire to secure by Letters Patent is:—

1. A device of the class described comprising a scow structure of double wall formation, transverse beams carried by the upper face of the bottom, coils supported in said beams and inclined upwardly and rearwardly, supply pipes for said coils embedded between the bottom walls, the connection between the supply pipes and coils intimately engaging the upper section of the bottom wall, and air floats associated with the scow exteriorly thereof.

2. A device of the class described comprising a scow of double wall formation, entrance gates at one end thereof, coils arranged in said scow above the bottom wall, supply pipes for said coils positioned between the bottom walls, the connection between the supply pipes and coils directly engaging the upper section of the bottom wall adjacent one end thereof, and buoyant means associated with the scow exteriorly thereof.

In testimony whereof I affix my signature.

MARY V. WILSON.

Copies of this patent may be obtained for five cents each, by addressing the "Commissioner of Patents, Washington, D. C."